(12) United States Patent
Minato et al.

(10) Patent No.: US 8,540,809 B2
(45) Date of Patent: Sep. 24, 2013

(54) STRUCTURE OF EXTERNAL COVER OF AIR DRYING APPARATUS

(75) Inventors: Ichiro Minato, Tokyo (JP); Takeo Shimomura, Tokyo (JP); Hiroyuki Murakami, Tokyo (JP); Hirohisa Todoki, Tokyo (JP)

(73) Assignee: Nabtesco Automotive Corporation, Tokyo (JP)

( * ) Notice: Subject to any disclaimer, the term of this patent is extended or adjusted under 35 U.S.C. 154(b) by 5 days.

(21) Appl. No.: 13/389,934

(22) PCT Filed: Aug. 10, 2010

(86) PCT No.: PCT/JP2010/063790
§ 371 (c)(1),
(2), (4) Date: Feb. 10, 2012

(87) PCT Pub. No.: WO2011/019084
PCT Pub. Date: Feb. 17, 2011

(65) Prior Publication Data
US 2012/0137887 A1  Jun. 7, 2012

(30) Foreign Application Priority Data
Aug. 11, 2009  (JP) .................................. 2009-186212

(51) Int. Cl.
*B01D 53/02* (2006.01)

(52) U.S. Cl.
USPC .............. 96/134; 95/45; 95/117; 55/DIG. 17; 123/198 E

(58) Field of Classification Search
USPC ................. 95/45, 117; 96/134; 55/DIG. 17; 123/198 E
See application file for complete search history.

(56) References Cited

U.S. PATENT DOCUMENTS

| | | | | | |
|---|---|---|---|---|---|
| 4,544,385 | A | * | 10/1985 | Tanaka | 96/114 |
| 4,713,094 | A | * | 12/1987 | Yanagawa et al. | 96/147 |
| 5,002,593 | A | * | 3/1991 | Ichishita et al. | 96/137 |
| 5,286,283 | A | * | 2/1994 | Goodell | 96/113 |
| 5,607,500 | A | * | 3/1997 | Shamine et al. | 96/144 |

(Continued)

FOREIGN PATENT DOCUMENTS

| | | |
|---|---|---|
| JP | 2002-210323 A | 7/2002 |
| WO | 2010082610 A1 | 7/2010 |

OTHER PUBLICATIONS

Int'l Search Report issued Jan. 25, 2011 in Int'l Application No. PCT/JP2010/063790.

*Primary Examiner* — Christopher P Jones
(74) *Attorney, Agent, or Firm* — Panitch Schwarze Belisario & Nadel LLP

(57) ABSTRACT

An external cover of a replaceable cartridge forms at least a portion of an air drying apparatus of a compressed air brake for a vehicle. A first slope is formed at an intermediate position between an extremity of a rising piece and a bottom of an external cover, and a left vertical wall is formed. A right vertical wall is formed opposite the left vertical wall. A top face is formed between the left vertical wall and the right vertical wall. An indentation is defined by the left vertical wall, the right vertical wall, and the top face. A sealing member is fitted into the indentation. A circular-arc portion is formed at a lower end of the right vertical wall. A second slope is formed in an extending manner at a predetermined height from a lower end face that is an intermediate position on a height of the external cover.

2 Claims, 11 Drawing Sheets

(56) References Cited

U.S. PATENT DOCUMENTS

| | | | |
|---|---|---|---|
| 6,641,633 B2 * | 11/2003 | Witengier | 55/319 |
| 6,723,154 B2 * | 4/2004 | Olsson et al. | 95/118 |
| 6,878,194 B2 * | 4/2005 | Hoffman et al. | 96/147 |
| 6,951,581 B2 * | 10/2005 | Fornof et al. | 95/122 |
| 7,097,696 B2 * | 8/2006 | Salzman et al. | 96/121 |
| 7,625,437 B2 * | 12/2009 | Heer | 96/134 |
| 7,691,163 B2 * | 4/2010 | Tao et al. | 55/385.3 |
| 7,727,313 B2 * | 6/2010 | Blackwood et al. | 96/134 |
| 7,892,329 B2 * | 2/2011 | Milomo | 96/134 |
| 2002/0104440 A1 * | 8/2002 | Miller et al. | 96/421 |
| 2004/0094036 A1 * | 5/2004 | Nichols et al. | 95/148 |
| 2006/0123743 A1 | 6/2006 | Heer | |
| 2007/0144350 A1 * | 6/2007 | Paling | 96/134 |
| 2007/0180999 A1 * | 8/2007 | Paling et al. | 96/134 |
| 2008/0307965 A1 * | 12/2008 | Hoffman et al. | 95/119 |
| 2009/0038476 A1 * | 2/2009 | Blackwood et al. | 96/115 |
| 2011/0308393 A1 | 12/2011 | Minato et al. | |

* cited by examiner (a)

Prior Art

US 8,540,809 B2

STRUCTURE OF EXTERNAL COVER OF AIR DRYING APPARATUS

CROSS-REFERENCE TO RELATED APPLICATIONS

This application is a Section 371 of International Application No. PCT/JP2010/063790, filed Aug. 10, 2010 which was published in the Japanese language on Feb. 17, 2011, under International Publication No. WO 2011/019084 A3 and the disclosure of which is incorporated herein by reference.

BACKGROUND OF THE INVENTION

The present invention relates particularly to an external cover of a replaceable cartridge that makes up an air drying apparatus, like a compressed-air brake system for a vehicle, or the like. The present invention also relates to a structure of an external cover of an air drying apparatus that prevents occurrence of an air leakage, which would otherwise be attributable to anomalous deformation of a sealing member placed at a bottom of the replaceable cartridge when the replaceable cartridge is screw-engaged with and fastened to a substrate of the air drying apparatus, thereby enhancing hermeticity between the replaceable cartridge and the substrate and, by extension, quality and reliability of the air drying apparatus.

A technique disclosed in US Patent Application Publication No. 2006/0123743A1 shown in FIG. 4 has hitherto been available as an example air drying apparatus of this type for dehumidifying an inflow air and removing an oil.

Explanations are now given to the technique. Referring to FIG. 4, reference numeral 1 designates an air drying apparatus that includes an outer case 2 and a base 3 fastened to a lower end 2a of the outer case 2. The base 3 has inlet ports 3a for allowing inflow of compressed air that has not yet been dried and an outlet port 3b drilled in a substantial center area of the base. The base 3 is formed into the shape of a disc whose entirety has a predetermined thickness. A cylindrical outshoot 3c is formed at a substantial center portion of the base 3 that has the outlet port 3b for letting a dehydrated, compressed air out. Eight inlet ports 3a set up in the form of a circumference at predetermined spacing of; for instance, about 45 degrees, are arranged along an outer edge of the outlet port 3b of the base 3.

An inner case 2A is provided on an inner side of the outer case 2. The inner case 2A is formed in a cylindrical shape made up of an upper large-diameter elongated cylindrical body 2b and a lower small-diameter elongated cylindrical body 2c. A plurality of discharge orifices 2f made up of small orifices that are in mutual communication with the outlet port 3b of the base 3 are bored in a bottom plate 2e of the smaller-diameter elongated cylindrical body 2c of the inner case 2A. A filter plate 4 is laid over an upper surface of the bottom plate 2e. In the meantime, a first filter 5 is sandwiched between a lower surface of an outer edge of the bottom plate 2e and an upper surface of an outer edge of the base 3.

A cylindrical outshoot 2g is protrudingly set at a substantial center of a lower surface of the bottom plate 2e of the inner case 2A. An extremity of the cylindrical outshoot 2g is fixedly held on an outer edge of the cylindrical outshoot 3c that is upwardly formed in a substantial center area of the base 3 with a sealing member 2h sandwiched therebetween. An airflow channel S1 is defined between an outer peripheral surface of the large-diameter elongated cylindrical body 2b of the inner case 2A and an inner peripheral surface of the outer case 2, whilst a bypass pathway S2 is defined between an outer peripheral surface of the small-diameter elongated cylindrical body 2c of the inner case 2A and the inner peripheral surface of the outer case 2.

Reference numeral 6 designates a second filter that is fixedly interposed, within the bypass pathway S2, between a lower surface of the outer edge of the large-diameter elongated cylindrical body 2b of the inner case 2A and a lower edge of the small-diameter elongated cylindrical body 2c. An external cover 8 whose lower end has a sealing member 7 is fastened to a lower portion of the base 3. Inflow ports 8a remaining in mutual communication with the respective inlet ports 3a of the base 3 and an outflow port 8b remaining in mutual communication with the outlet port 3b of the base 3 are formed in the external cover 8. In the drawings, reference numeral 2d designates a lid plate of the inner case 2A, and a cylindrical body 2j is protrudingly put at the center of the lid plate 2d. Further, a plurality of orifices 2k are bored in the lid plate. A filter plate 9 is put on a lower surface of the lid plate 2d, thereby sealing a desiccant 10 filling an interior of the inner case 2A. Reference numeral 11 designates a spring that is coiled within the cylindrical body 2j and supported by an upper wall surface 2i of the outer case 2.

In the drawing, reference symbol V designates a check valve that is disposed in the bypass pathway S2.

Since the air drying apparatus 1 of the related-art example has the foregoing structure, the compressed air that has not yet been dehydrated and that has flowed from a compressor (not shown) flows from an inlet port 3a into the second filter 6 and the air flow channel S1 by way of the first filter 5 and the bypass pathway 2S. The compressed air further flows into the desiccant 10 by way of the orifices 2k of the lid plate 2d. The compressed air further undergoes drying and dehumidification in the desiccant 10, passing by the discharge orifices 2f of the bottom plate 2e by way of the filter plate 4 and finally exiting from the outlet port 3b of the base 3.

The structure of the external cover of the air drying apparatus in the related art has the foregoing structure and confronts the following problem.

Specifically, the sealing member 7 is fitted into an indentation 8c of the external cover 8. An outer peripheral portion 8d of the indentation 8c acts so as to press the indentation 8c in a compressing manner, thereby preventing the sealing member 7 fitted into the indentation 8c from coming off from the indentation 8c. However, a lower edge of the outer peripheral portion 8d makes a sharp angle, and pressure bonding force exerted on the sealing member 7 is weak. In addition, the air drying apparatus 1 is used for years, whereby the indentation 8c deteriorates with time, thereby causing a problem of fall of the sealing member 7 from the indentation 8c.

A structure of an external cover of an air drying apparatus of the present invention is to solve the drawback and establish the next structure and means.

BRIEF SUMMARY OF THE INVENTION

Specifically, a first preferred aspect of the present invention provides an external cover that includes an outer case and a base which is housed in the outer case and which has a large-diameter cylindrical body. A small-diameter cylindrical body is formed integrally with the large-diameter cylindrical body. A drying case includes a desiccant filled in the large-diameter cylindrical body. A base is fixed to a lower end of the drying case and has an inlet port and an outlet port for compressed air. The structure is fixed by swaging an outer edge to a lower end of the outer case. The external cover includes a rising piece that is inserted into and engaged with an inlet port of the base for compressed air, a first slope that is formed at an intermediate position between the rising piece and a bottom, an outer vertical wall that is formed so as to rise from the bottom, a top face formed at an upper end of the outer vertical wall, an inner vertical wall that is formed opposite to the outer vertical wall, a circular-arc portion that is formed at a lower end of the inner vertical wall, a second slope formed at a position on the circular-arc portion that corresponds to an intermediate position of a height H1 of the external cover and a position of a predetermined height H2 from a lower end face, an outermost vertical wall that is formed so as to fall from the second slope by way of the circular-arc position, and a sealing agent that is fitted to an indentation defined by the outer vertical wall, the top face, and the inner vertical wall.

A second preferred aspect of the present invention is based on the first preferred aspect of the inventor, wherein an angle of inclination θ1 which a surface of the first slope forms with a surface of the outer vertical wall is set to 45°, and an angle of inclination θ2 which a back surface of the second slope forms with a back surface of the outermost vertical wall is set to 45°.

A structure of an external cover of an air drying apparatus according to a preferred embodiment of the present invention has the above-mentioned configuration and hence yields the following advantages.

Specifically, according to the first and second preferred aspects of the present invention, the external cover is configured such that the lower end of the inner vertical wall makes up a circular-arc portion and that a second slope is formed in an extending manner at an intermediate position of a height H1 of the external cover 16 which corresponds to a predetermined height H2 from the lower end face. An angle of inclination θ2 which the back surface of the second slope forms with the back surface of the outermost vertical wall 16q is set to about 45°. Stress exerted on the circular-arc portion constantly acts from the circular-arc portion to the outside of the indentation by way of the second slope, thereby holding the fitted sealing member in a pressed-contact state at all times. Hence, the indentation is constantly held in a nipped state by means of both sides of the indentation; namely, the outer vertical wall and the inner vertical wall. Thus, in addition to yielding an advantage of enhanced sealing characteristic, the air drying apparatus yields enhanced quality and durability.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
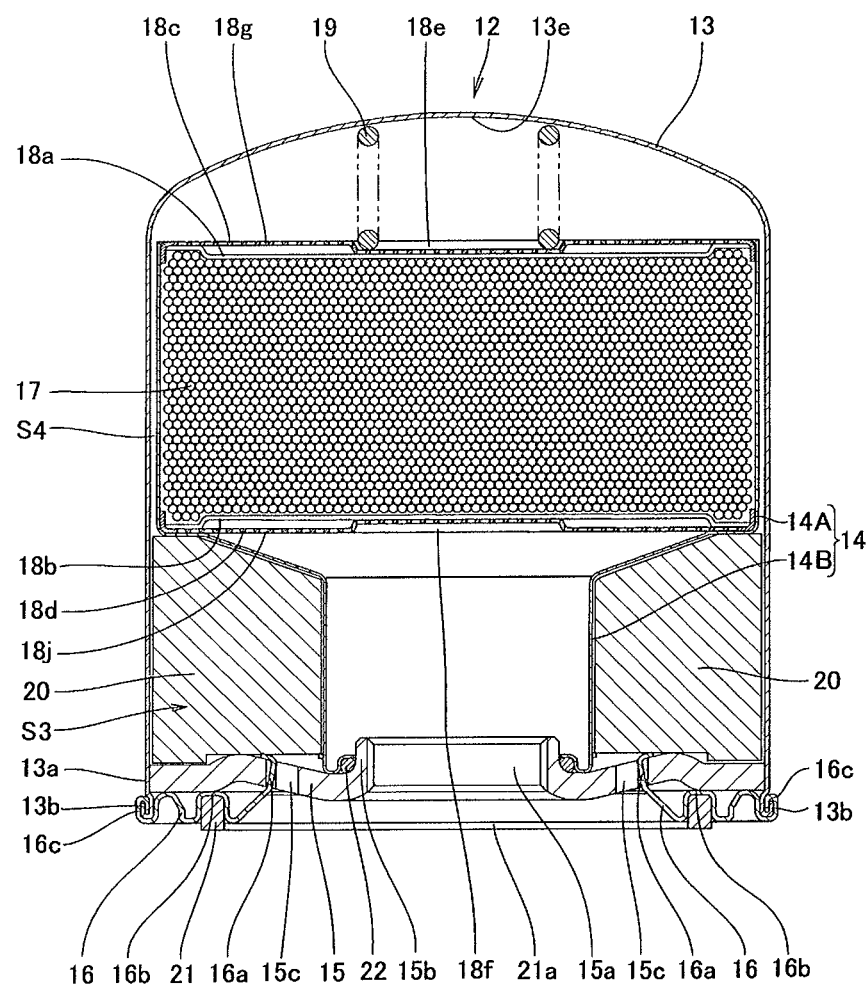
FIG. 1 is a vertical cross sectional view showing a preferred embodiment of a structure of an external cover in an air drying apparatus of the present invention.

Certain terminology is used in the following description for convenience only and is not limiting. The words "right," "left," "lower," "bottom," "upper" and "top" designate directions in the drawings to which reference is made. The words "inwardly" and "outwardly" refer to directions toward and away from, respectively, the geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

An implementation mode of a structure of an external cover in an air drying apparatus of the present invention is now described in detail by reference to FIG. 1.

FIG. 1 is a vertical cross sectional view showing an internal structure of the air drying apparatus.

Reference numeral 12 designates an air drying apparatus of a preferred embodiment of the present invention substantially made up of an outer case 13; a drying case 14 housed in the outer case 13; a base 15 fixed to a lower end 13a of the outer case 13; and an external cover 16 that supports the base 15 from below and that is fastened to an edge 13b of the lower end 13a. The outer case 13 is made up of, for instance, a cold rolled steel plate, an electrogalvanized steel plate, or the like, and entirely into a hollow bell shape.

The drying case 14 is preferably made up of the same material as that of the outer case 13 and entirely assumes a substantially-cylindrical shape. The drying case 14 assumes a large-diameter elongated cylindrical body 14A and a small-diameter elongated cylindrical body 14B that is formed integrally along with the large-diameter elongated cylindrical body 14A. The large-diameter elongated cylindrical body 14A is filled with a granular desiccant 17. The granular desiccant 17 is a high-performance desiccant that is made from a material; for instance, synthetic zeolite. A filter plate 18c is laid on an upper surface of the large-diameter elongated cylindrical body 14A by way of a filter 18a, and a bottom surface of the large-diameter elongated cylindrical body 14A is covered with a filter plate 18d by way of a filter 18b. The filters 18a and 18b are formed from; for instance, a polyester material, or the like, into a substantial disc shape having a slightly-indented center area.

The filter plates 18c and 18d are formed from the same material as that of the outer case 13 and into a thin-plate-like disc shape. An indentation 18e is formed in the center area of the filter plate 18c, and an indentation 18f is formed, in a penetrating manner, in the center area of the filter plate 18d. A support spring 19 is engaged in the indentation 19e of the upper filter plate 18c, thereby supporting the drying case 14. A plurality of small pores 18g are formed in the filter plate 18c, and a plurality of small pores 18j are formed in the filter plate 18d. As a result, a compressed air dried by the drying apparatus flows from the small pores 18g of the filter plate 18c, passing through the small pores 18j of the filter plate 18d by way of the filter 18a and the desiccant 17, running through the interior of the small-diameter elongated cylindrical body 14B, and flowing outwardly to an outlet port 15a of the base 15.

Reference numeral 19 designates a support spring that is coiled within the outer case 13 and that is supported by an upper wall surface 13c of the outer case 13 and the center area of the filter 18a. Reference numeral 20 designates an oil adsorbing agent that is formed so as to entirely assume a substantially toroidal shape and that is inserted into space S3 defined between an interior wall surface of the outer case 13 and the small-diameter elongated cylindrical body 14B of the drying case 14. The oil adsorbing agent 20 is preferably a high-performance oil adsorbing agent. For instance, TEIJIN OLSORB (Trade Name), can also be adopted for the oil adsorbing agent.

The base 15 has the outlet port 15a that is formed into; for instance, a disc shape whose entirety has a predetermined thickness and has a substantially center area that is formed into a cylindrical outshoot 15b for letting dehydrated compressed air out. Eight inlet ports 15c are circumferentially set at predetermined spacings; for instance, an angle of about 45°, along an outer edge of the outlet port 15a of the base 15. Rising pieces 16a of the external cover 16 are engagedly inserted into respective interior wall surfaces of; for instance, eight inlet ports 15c, formed in the base 15. An indentation 16b is formed in an undersurface of the external cover 16, and a ring-shaped sealing member 21 is fitted into the indentation 16b. A through hole 21a is formed in the center area of the sealing member 21 and remains in mutual communication with the outlet port 15a of the base 15.

An outer edge 16c of the external cover 16 is inwardly formed in a curled shape. In the meantime, the edge 13b of the lower end 13a of the outer case 13 is formed in an outwardly-curled shape. A sealing agent; for instance, is applied to a space between the outer edge 16c and the edge 13b, and both edges are caulked so as to thus become fixed.

Reference numeral 22 in the drawing designates a sealing member. The sealing member is sandwiched between a lower edge of the small-diameter elongated cylindrical body 14B of the drying case 14 and an outer peripheral surface of the cylindrical outshoot 15b of the base 15, whereby both the drying case 14 and the base 15 are enhanced in hermeticity.

Operation, or the like, pertaining to the implementation mode of the air drying apparatus of the present invention is now described.

Since the air drying apparatus 12 has the foregoing structure, a compressed air that has been flowed from a compressor (not shown) not yet been dried flows through the oil adsorbing agent 20 in the space S3 from the inlet ports 15c, where various oil particles contained in the compressed air; for example, a heavy oil, a crude oil, a machine oil, a kerosene, and a light oil, and a moisture are eliminated. The oil adsorbing agent 20 has enhanced capability of storing oil contained in the compressed air.

In this case, the compressed air that can have been prevented from becoming enriched with oil by means of action of the oil adsorbing agent 20 is caused to flow into the desiccant 17. The dried air sent from the oil adsorbing agent 20 flows into the desiccant 17 by way of small space S4 between the outer case 13 and the large-diameter elongated cylindrical body 14A and through the small pores 18g of the filter plate 18c. The compressed air is further dehumidified and dehydrated, delivered to the small-diameter elongated cylindrical body 14B of the drying case 14, and emitted outside from the outlet port 15a of the base 15. Accordingly, the compressed air delivered into a tank disposed in a lower portion of the sealing member 21 will prevent an oil component from build up, so that the quality of the air drying apparatus can be enhanced. It is now better to make a total area of all the inlet ports 15c of the base 15 substantially equal to a cross sectional area of the spacing S4 perpendicular to the axis, wherein the spacing exists between the outer case 13 and the large-diameter elongated cylindrical body 14A of the drying case 14. In addition, it is better to make a cross sectional area of the small-diameter elongated cylindrical portion 14B of the drying case 14 perpendicular to the axis substantially equal to a cross sectional area of the outlet port 15a of the base perpendicular to the axis. It is also better to make a cross sectional area of the space S3 perpendicular to the axis, the space being defined between the interior wall surface of the outer case 13 and the small-diameter elongated cylindrical body 14B of the drying case 14, larger than a cross sectional area of the small-diameter elongated cylindrical portion 14B of the drying case 14 perpendicular to the axis. Moreover, it is better to make a total area of all the inlet ports 15c of the base 15 substantially equal to a cross sectional area of the outlet port 15a perpendicular to the axis. Further, it is also better to place the inlet ports 15c of the base 15 as closely as possible to the center of the base 15 with respect to the space S4. The layouts mentioned above may make a flow rate of the air in the space S3 slow, so that oil mist will become easier to turn into liquid droplets (become condensed).

The oil adsorbing agent 20 will not be discarded after being used and will be purified. Thus, the oil adsorbing agent 20 can be reused in the space S3, as long as a so-called cartridge is employed as the oil adsorbing agent 20. Further, the recycled oil adsorbing agent and a new oil adsorbing agent 20 are made replaceable.

Figure 2:
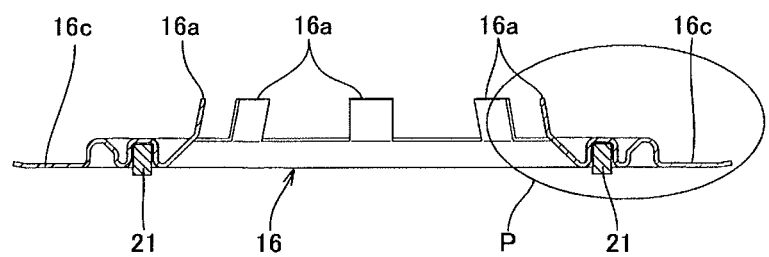
FIG. 2 is vertical cross sectional views showing the external cover applied to the air drying apparatus of the present invention, wherein (a) is a cross sectional view taken along arrow-headed line A-A shown in FIG. 3 and wherein (b) is an enlarged view of part P shown in (a)
Figure 2:
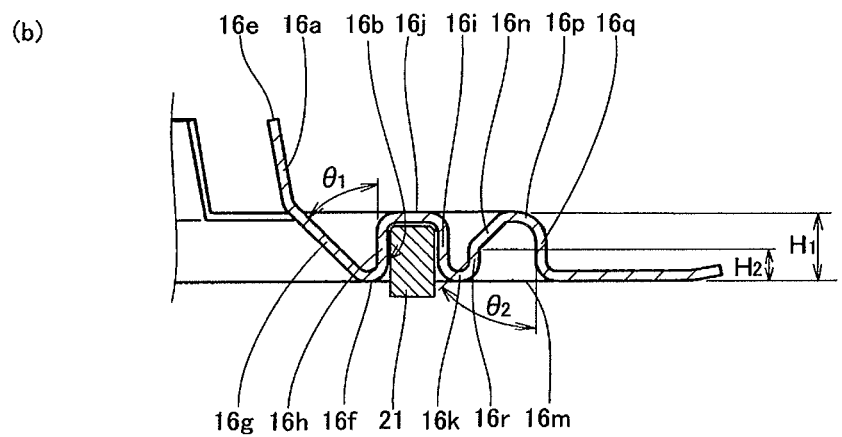

The external cover 16 that is a feature of the air drying apparatus of a preferred embodiment of the present invention is now described in detail. FIG. 2 is vertical sectional views showing the external cover 16 applied to the air drying apparatus of a preferred embodiment of the present invention, wherein (a) it is a cross sectional view taken along arrow-headed line A-A shown in FIG. 3 and wherein (b) it is an enlarged view of part P shown in (a).

Figure 3:
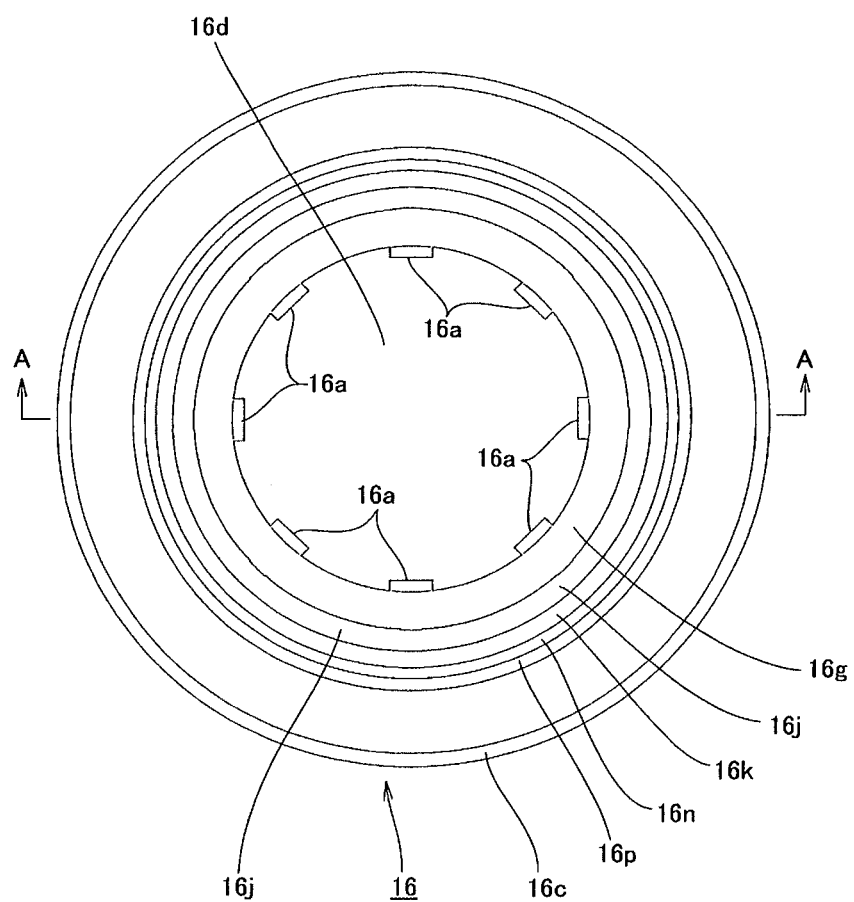
FIG. 3 is a plan view showing the external cover applied to the air drying apparatus of the present invention, wherein an outer edge of the external cover is not yet formed in a curled shape.
Figure 4:
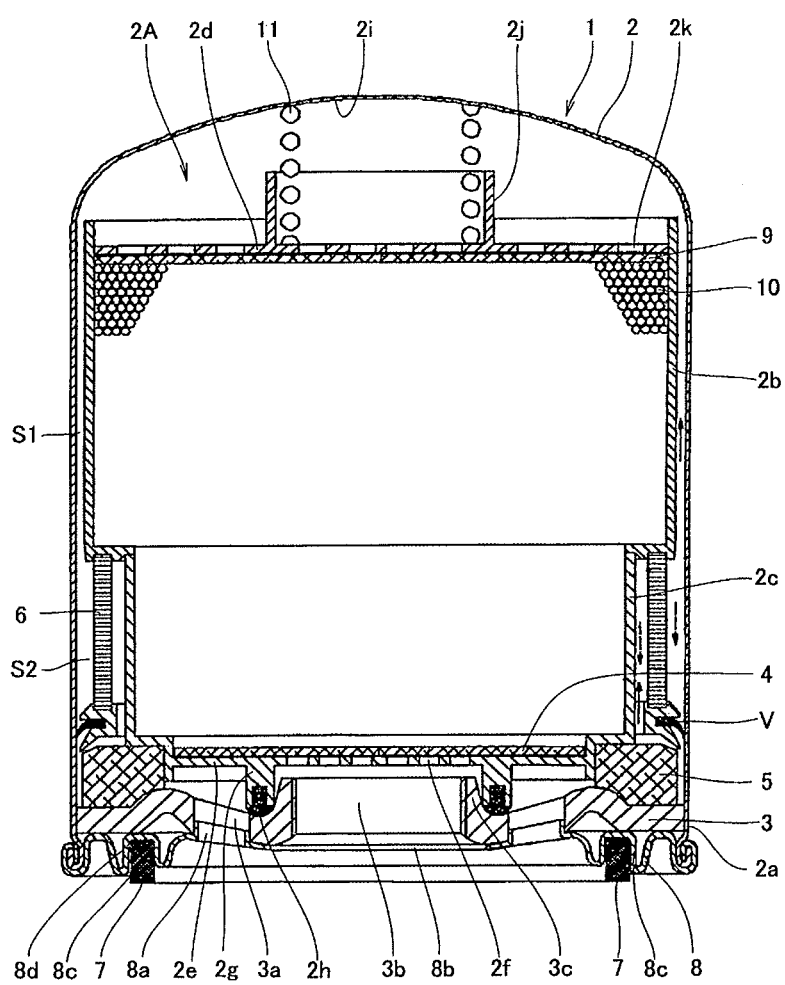
FIG. 4 is a vertical cross sectional view showing an example air drying apparatus according to the prior art.

As shown in FIG. 3, the entirety of the external cover 16 assumes a substantially disc-shaped form, and a completely circular through hole 16d is formed in a center area of the external cover 16. The plurality of rising pieces 16a; to be specific, eight rising pieces, are set in the implementation mode at predetermined angular spacings along a periphery of the completely circular through hole 16d. A first slope 16g is formed at a middle point between extremities 16e of the respective rising pieces 16a and a bottom 16f of the external cover 16. The first slope 16g is circumferentially formed along the completely, circular through hole 16d. A left (an outer) vertical wall 16h is formed so as to stand upright from the bottom 16f. An angle of inclination θ1 which a surface of the first slope 16g forms with a surface of the left (outer) vertical wall 16h is set to about 45°.

A right (inner) vertical wall 16i is formed opposite the left (outer) vertical wall 16h. A top face 16j is formed between the right vertical wall 16i and the left vertical wall 16h. The previously-described indentation 16b is formed from the left (outer) vertical wall 16h, the right (inner) vertical wall 16i, and the top face 16j. The indentation 16b is circumferentially laid along the completely, circular through hole 16d, and the sealing member 21 is fitted into the through hole. A lower end of the right (inner) vertical wall 16i forms a circular-arc portion 16k. A second slope 16n is formed, in an extending manner, at a predetermined height H2 from a lower end face 16m that is a middle point of the external cover 16 having a height H1. An outermost vertical wall 16q is formed so as to vertically fall from the second slope 16n by way of a circular-arc portion 16p. An angle of inclination θ2 which a back surface of the second slope 16n forms with a back surface of the outermost vertical wall 16q is set to about 45°. The external cover 16 assumes the height H1, and it is preferable that the predetermined height H2 from the lower end face 16m be set to about one-half the height H1 of the external cover 16.

The outer edge 16c of the external cover 16 is formed into an inwardly curled shape, whilst the edge 13b of the lower 13b of the outer case 13 is formed so as to be curled outwardly. A sealing agent; for instance, is applied to space between the edge 13b and the outer edge 16c, and both the edges are caulked so as to thus become fastened.

PREFERRED EMBODIMENTS

One of the preferred embodiments of the external cover 16 of the air drying apparatus of the present invention is now described by reference to FIG. 2(b).

From the above, the sealing member 21 is fitted into the indentation 16b, and the indentation 16b is made up of the left (outer) vertical wall 16h, the right (inner) vertical wall 16i, and the top face 16j. The first slope 16g is formed outside the indentation 16b; namely, in a middle position between the extremity 16e of each of the rising pieces 16a and the bottom 16f of the external cover 16. Since the angle of inclination θ1 is set to 45°, the stress exerted on the bottom 16f by the respective rising pieces 16a inwardly acts on the indentation 16b at all times, thereby holding the fitted sealing member 21 in a pressed contact all the time. Therefore, the sealing characteristic of the external cover is further enhanced by the sealing member 21.

In the meantime, a lower end of the right (inner) vertical wall 16i makes up the circular-arc portion 16k, and a vertical portion 16r having a desired length rises from the circular-arc portion 16k and is formed integrally with the vertical wall 16i. The second slope 16n is formed from the vertical portion 16r. Specifically, a position of the upper end of the vertical portion 16r is in the middle of the height H1 of the external cover 16; namely, at a predetermined height H2 from the lower end face 16m. The second slope 16n is formed so as to extend from the vertical portion 16r. An angle of inclination θ2 which a back surface of the second slope 16n forms with a back surface of the outermost vertical wall 16q is set to about 45°. Stress exerted on the circular-arc portion 16k by the circular-arc portion 16p by way of the second slope 16n constantly acts on the outside of the indentation 16b, thereby holding the fitted sealing member 21 in a state of pressure contact at all times.

Therefore, the indentation 16b is held in a nipped state at all times between both sides; namely, the left (outer) vertical wall 16h and the right (inner) vertical wall 16i, so that improvements in quality and durability of the air drying apparatus as well as enhancement of the sealing characteristic can be fulfilled.

A method for processing the lower end 13a of the outer case 13 and the outer edge 16c of the external cover 16 is implemented by means of bringing a horizontal portion of the lower end 13a of the outer case 13 and a horizontal portion of the outer edge 16c of the external cover 16, both of which have extensions, into a close contact with each other and swaging the thus-contacted horizontal portions together. The lower end 13a of the outer case 13 and the outer edge 16c of the external cover 16 thus assume a shape and a structure, such as those shown in FIG. 1.

Second Preferred Embodiment

Another preferred embodiment is directed toward a structure of a silencer of a compressed air drying apparatus employed in a compressed air brake system for a vehicle, or the like.

Figure 11:
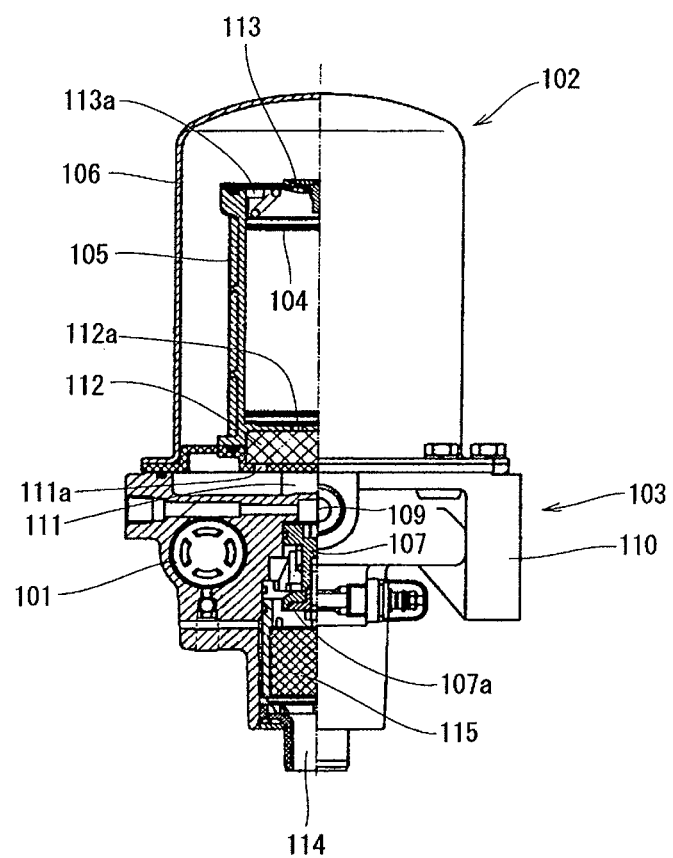
FIG. 11 is a vertical cross sectional view showing an example of a compressed air drying apparatus according to the prior art.

A first example of the silencer in a compressed air drying apparatus used in a compressed air brake system for a vehicle of this type corresponds to a technique that is described in Japanese Patent No. 3771450 and shown in FIG. 11. FIG. 11 shows a structure in which a governor 101 is accommodated in a base member 3, and explanations are now given to the structure. In a compressed air drying apparatus 102, there are fixedly provided the base member 103, a dryer 105 that is placed on the base member 103 and filled with a desiccant 104, and a purge tank 106 formed around the dryer 105. The compressed air drying apparatus 102 includes an inlet port 109, an outlet port (not shown) and a drain valve 107, and the governor 101. The compressed air drying apparatus 102 is fastened to a vehicle, or the like, by means of an attachment flange 110 with the base member 103 situated at a lower position. Compressed air that is supplied from the inlet port 109 and discharged by a compressor flows into a pressure chamber 111; further flows into the dryer 105 through pores 112a by way of a filter 112. The thus-entered compressed air is dehumidified by the desiccant 104. The thus-dehumidified air flows into the purge tank 106 by way of a check valve 13 and a regeneration throttle 113a of the dryer 105. The compressed air flowed into the purge tank 106 flows into a main tank from the check valve (not shown) by way of the outlet port. The drain valve 7 is interposed between the pressure chamber 111 and an exhaust passage having an exhaust pipe 114. According to a command signal from a pressure governor, the drain valve 7 releases the compressed air supplied to the inlet port 109 into the atmosphere from the pressure chamber 111 by way of an exhaust valve 107a and also from the silencer 115 by way of the exhaust pipe 104, thereby bringing the compressor into an unloaded operation mode and dehydrating the desiccant 104 of the compressed air drying apparatus 102.

In the second example of the prior art, another separate substantially-cylindrical base member, for instance, is joined to and screw-engaged with a lower end of the previously-described base member 103 of the first example. Another silencer differing from that shown in FIG. 8; namely, a second silencer, is accommodated into the separate substantially-cylindrical base member.

In the first example of the prior art, the silencer 115 fitted to the base member 103 is single, and the compressed air drying apparatus 102 has a short entire length and becomes compact. However, there still exists a problem of the silencer 115 attached in order to lessen noise emission of the compressed air to the atmosphere being unable to yield an expected effect. In order to solve the problem of the first example, the second example of the related art employs a configuration in which another separate substantially-cylindrical base member is joined to and screw-engaged with the lower end of the base member 103 of the first example shown in FIG. 11 and in which the second silencer is added to an interior of the separate substantially-cylindrical base member. The second example fulfills functions of two silencers, to thus be able to completely lessen noise incident to emission of the compressed to the atmosphere. However, the second example has a problem of the entire length of the compressed air drying apparatus 102 being long and another problem of an additional increase in entire length being involved. For these reasons, the second example has an underlying problem of a limitation being imposed on a fixing point of the compressed air drying apparatus during installation of the apparatus in a vehicle, or the like. Moreover, another separate substantially-cylindrical base member is also required, which in turn gives rise to an increase in number of components, an increase in number of production steps, and a quality problem.

The structure of the silencer of the compressed air drying apparatus of a preferred embodiment the present invention has been conceived to solve the problems of the silencer, has a structure and means to be described below, and yields advantages to be described below.

Specifically, there is provided a structure of a silencer for use in a compressed air drying apparatus comprising a support base having an inlet port, an outlet port, and a drain valve device; a drying container including the support base filled with a desiccant; and a purge tank surrounding the drying container and the outside of the drying container. A cylindrical outshoot is formed in a lower side of the support base. Further, a plurality of silencer spacers are provided at the inside of the cylindrical outshoot.

By virtue of such a structure, a plurality of silencer spacers, each of which includes a base having a plurality of pores and a space subjected to decompression and expansion are arranged within an exhaust stack; namely, a cylindrical outshoot, whereby the base and the space can be alternately arranged at an equal distance. Thus, there are yielded advantages of the ability to shorten the entire length of the silencer spacer and lessen exhaust noise without involvement of a projection from a drying container.

Moreover, there is provided a structure of a silencer for use in a compressed air drying apparatus including a support base having an inlet port, an outlet port, and a drain valve device; a drying container made up of the support base filled with a desiccant; and a purge tank surrounding the drying container and an outside of the drying container. The structure further includes a cylindrical outshoot formed in a lower side of the support base; a plurality of silencer spacers arranged within the cylindrical outshoot; and at least one or a plurality of noise absorbing materials that fill any of spaces of the silencer spacers.

As a result of implementation of such a structure, there is yielded an advantage of the ability to further reduce exhaust noise by installing the noise absorbing material in the space.

There is also provided a structure of a silencer for use in a compressed air drying apparatus including, in addition to the structure, the silencer spacers, wherein each of the silencer spacers is a cylindrical body that has its one end closed and that also has an upper outwardly-projecting rim and a lower outwardly-projecting rim which are circumferentially provided around the cylindrical body. The cylindrical body has a base, an outer case formed so as to rise from the surrounding of the base, and a space. A plurality of pores are formed so as to penetrate through the base. Engagement holes are formed on a lower side of the upper outwardly-projecting rim, and projections are formed on the lower outwardly-projecting rim.

Because of adoption of such a structure, the silencer spacers further assume the following shape. Namely, projections are formed on one outwardly projecting rim, and corresponding engagement holes are formed on the other outwardly projecting rim so that mutually-opposing silencer spacers can be fittingly engaged with each other when a plurality of silencer spacers are placed within a cylindrical outshoot. As a result, there is yielded an advantage of achievement of considerably easier fitting and fastening of the silencer spacers and enhanced ease of assembly.

There is provided a structure of a silencer for use in a compressed air drying apparatus that includes, in addition to the previous structure, the silencer spacers that are fitted and fastened to the inside of the cylindrical outshoot while mutually-opposing two silencer spaces; namely, an upper silencer spacer and a lower silencer spacer, are held out of phase with each other.

By means of such a configuration, a plurality of mutually-opposing silencer spacers are fitted and fastened to each other while groups of small pores bored in the base are held out of phase with one another. Hence, there is yielded an advantage of the ability to arbitrarily set a positional relationship and enhance a silencing effect.

The preferred embodiment of the structure of the silencer in the compressed air drying apparatus of the present invention is hereunder described in detail by reference to the accompanying drawings.

Figure 5:
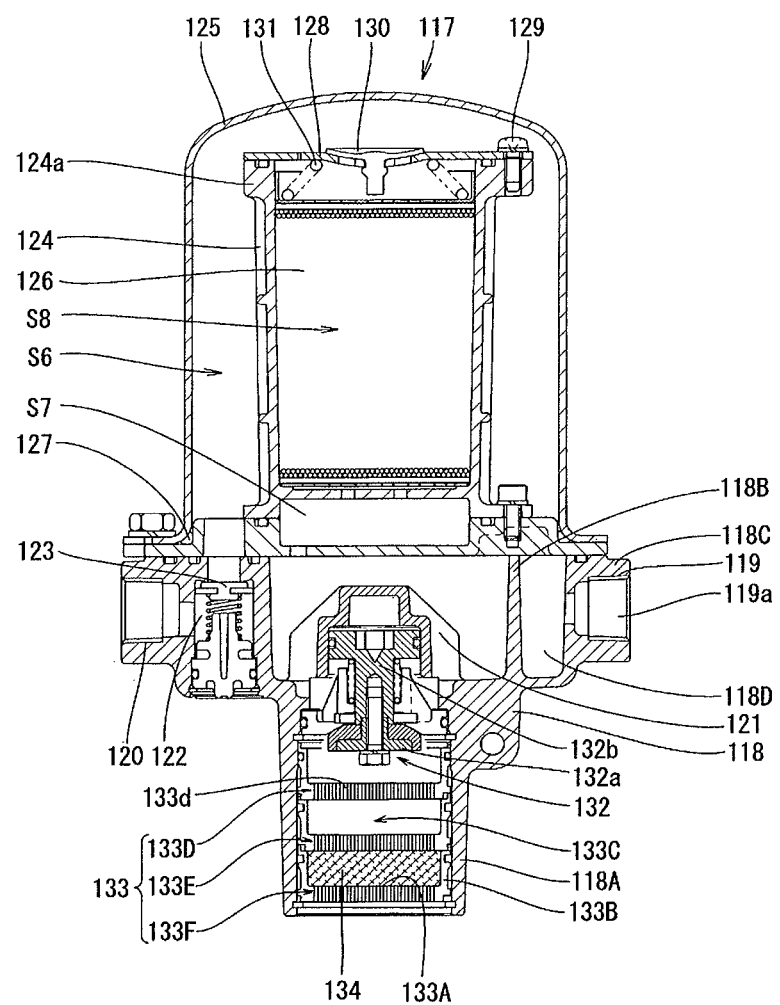
FIG. 5 is a vertical cross sectional view showing a preferred embodiment of a structure of a silencer in a compressed air drying apparatus of the present invention.
Figure 6:
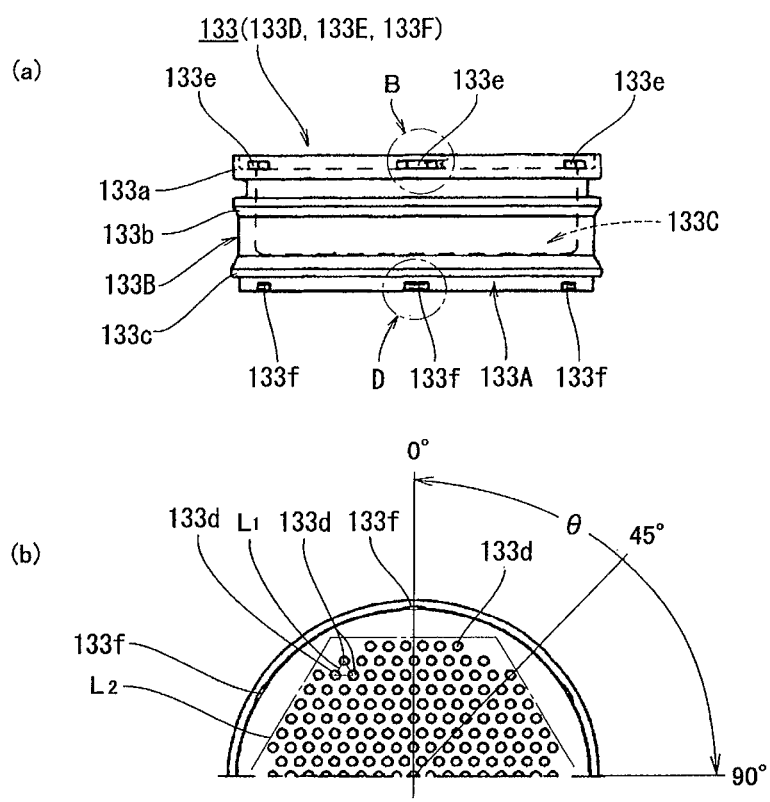
FIG. 6 shows views of an example silencer spacer employed in the compressed air drying apparatus of the present invention, wherein (a) is an external view of the silencer spacer and wherein (b) is a bottom view of the silencer spacer shown in (a)
Figure 7:
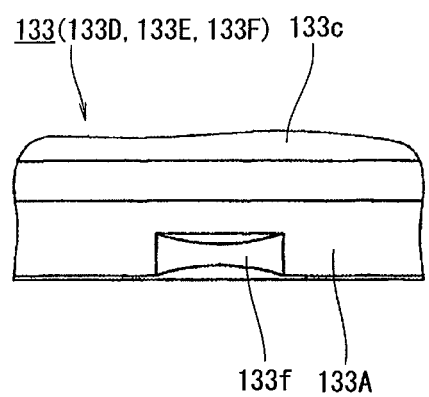
FIG. 7 shows enlarged views of respective portions shown in FIG. 6, wherein (a) is an enlarged view of a portion designated by arrow-headed line D shown in FIG. 6(a) and wherein (b) is an enlarged view of a portion designated by arrow-headed line B shown in FIG. 6(a)
Figure 7:
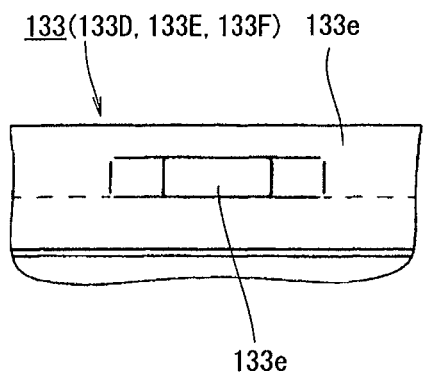

FIG. 5 is a vertical cross sectional view showing an example mode of the structure of the silencer in the compressed air drying apparatus of a preferred embodiment of the present invention. FIG. 6 is enlarged views showing a silencer portion attached to the compressed air drying apparatus shown in FIG. 5, wherein (a) is an external view of the silencer and wherein (b) is a bottom view of the same. FIG. 7 is enlarged views of respective portions shown in FIG. 6, wherein (a) is an enlarged view of a portion designated by arrow-headed line D shown in FIG. 6(a) and wherein (b) is an enlarged view of a portion designated by arrow-headed line B shown in FIG. 6(a).

A thick support base 118 is set at the bottom of a compressed air drying apparatus 117. The support base 118 is a metal molded article made of aluminum or its alloy. An inlet port 119 remaining in mutual communication with an exhaust port of an air compressor (not shown) is formed in one side surface of the support base 118, and an outlet port 120 remaining in mutual communication with a main tank (not shown) is formed in the other side surface of the same. The outlet port 120 and the inlet port 119 work as pipe connection ports and are built from; for instance, screw holes.

The inlet port 119 mutually connected to the main tank (not shown) extends from an inlet bore 119a stretching in a radial direction as far as, while passing through the center longitudinal hole 121, an upper surface of the support base 118 in a mutually-communicated manner. A compressed air that has finished being dried is delivered from a first chamber S6 to the outlet port 120 by way of a check valve 123 in an upper portion of a valve housing bore 122.

A cylindrical outshoot 118A is integrally placed on a lower surface of the support base 118. An inner ring 118B and an outer ring 118C are concentrically provided on the upper surface of the support base 118. The outer ring 118C is formed so as to become thicker than the inner ring 118B. A portion of the upper surface of the support base 118 located between the inner ring 118B and the outer ring 118C is deeply recessed, whereby a ring-shaped space 118D exists. The inlet port 119 and the ring-shaped space 118D are in mutual communication with each other, and a compressed air that has not yet been dried exists in both of them. A wall of the inner ring 118B is partial, and the ring-shaped space 118D and the inside of the inner ring 118B are in mutual communication with each other. In the course of loading, the compressed air flows into the inlet port 119 and subsequently passes through, in sequence, the ring-shaped space 118D, the inside of the inner ring 118B, a second chamber S7, a large-capacity housing area S8, a check valve 130, the first chamber S6, and the check valve 123.

In addition to having the support base 118, the compressed air drying apparatus 117 has a drying container 124 situated on the support base 118 and a purge tank 125 serving as an external cover. The drying container 124 is a container storing therein a granular desiccant 126. The purge tank 125 corresponds to a cover that surrounds an outer periphery of the drying container 124 and has the first chamber S6 that stores compressed air between the purge tank 125 and the drying container 124. The purge tank 125 and the drying container 124 fit each other. A seal ring 127 for sealing purpose is sandwiched between the fit portion of the purge tank 125 and the fit portion of the drying container 124. A screw fixing element 124a is juttingly formed along an upper rim of the drying container 124. A predetermined number of screw fixing element 124a; for instance, eight, is provided along the rim. A cap member 128 is secured to an upper surface of each of the screw fixing elements 124a by means of mounting bolts 129.

A lower large-diameter portion of the drying container 124 has a ring-shaped inner space. The ring-shaped inner space defines the second chamber S7 that stores yet-to-be-dried compressed air, in conjunction with the ring shaped space 118D of the support base 118. The second chamber S7 that stores the compressed air and the first chamber S6 that stores the compressed air are in mutual communication with each other by way of a plurality of mutually-connected pores (not shown).

A small-capacity housing serving as the second chamber S7 is assured at the bottom of the inside of the drying container 124. A large-capacity housing S8 is on the small-capacity housing. The small-capacity housing that is placed on the bottom and that serves as the second chamber S7 may also be filled with a filter element. The large-capacity housing S8 on the second chamber S7 is filled with the renewable granular desiccant 126. The desiccant 126 in the container can be replaced by means of loosening the plurality of mounting bolts 129 and taking off the cap member 128 on the drying container 124. A comparatively large passage that is closed by the check valve 130 is opened in the cap member 128. A coil spring 131 used for appropriately filling the granular desiccant 126 is coiled at a position below the cap member 128.

Accordingly, the compressed air to be dried first enters the inlet bore 119a, and compressor oil or dust are eliminated from the air by means of; for instance, a filter element. Subsequently, the thus-filtered air is dehumidified in the course of passing through the desiccant 126. By opening the check valve 130, the thus-dehumidified, dried compressed air flows into the first chamber S6 that stores the compressed air of the purge tank 125 from a passageway. A portion of the compressed air that has thus flowed in is stored as signal pressure for the pressure governor by way of the check valve 123 and the valve housing bore 122 in the support base 118, and the remaining air is stored in the external main tank by way of the outlet port 120. The compressed air in the main tank is utilized for actuation of respective pieces of hardware of; for instance, an air brake system.

A drain valve device 132 is placed in a vertical bore 121 in the center of the support base 118. The drain valve device 132 has a drain valve 132a for letting a drain out and a piston 32b. The drain valve 132a doubles also as an open valve for letting a drain outside during a cycle for renewing the desiccant 126. Although the drain valve 132a is closed when the compressed air originating from the air compressor is dried, the piston 32b descends in accordance with a command signal from the pressure governor (not shown) when internal pressure of the main tank comes to a predetermined value, whereupon the drain valve 132a is opened. The drain including a water content or oil is swiftly discharged outside along with the compressed air in response to opening action of the drain valve 132a. For this reason, in order to lessen noise incident to emission, a silencer spacer 133 is provided at an outlet port of the drain valve 132a.

The drying container 124 and the purge tank 125 are removably attached to the compressed air drying apparatus 117. Further, the drying container 124 and the purge tank 125 are removably attached to the support base 118.

The silencer spacer 133 of the present invention is now described in detail. As shown in FIG. 6(a), the entire shape of the silencer spacer 133 is defined as a cylindrical body having a closed end. The silencer spacer is built from a base 133A, an outer case 133B formed so as to stand upright from the periphery of the base 133A, and a space area 133C. As shown in FIG. 6(a), an outer peripheral surface of the outer case 133B of the silencer spacer 133 includes an outwardly-projecting rim 133a provided along a rim of an upper portion of the outer peripheral surface, an outwardly-projecting rim 133b provided along a rim of a middle portion of the outer peripheral surface, and an outwardly-projecting rim 133c provided along a rim of a lower portion of the outer peripheral surface. A plurality of small pores 133d are formed so as to penetrate through the base 133A of the silencer spacer 133. Thus, the small pores make up a group and are formed integrally in the outer case 133B. As can be seen from FIG. 6(b) showing a bottom view of FIG. 6(a), the small pores 133d assume; for instance, a perfect circular shape, and a diameter of; for example, 1.2 (mm). 253 small pores are arranged in rows, to thus make up a group. As shown in FIG. 6(b), an example layout of the small pores 133d is defined by means of putting the small pores in such a way that the centers of the small pores 133d, 133d, and 133d come to respective three apexes of a small triangular line L1. An outer line L2 defining group of small pores 133d; namely, a plurality of pore groups, assumes a substantially hexagonal fringe. Therefore, the outside of the outer line L2 becomes a space where the small pores 13d are not present at all. A geometry that assures strength and that prevents leakage of air, which would otherwise occur when the noise absorbing material is installed, is thus accomplished.

As shown in FIG. 6(a) and FIG. 7(b), engagement holes 133e . . . are formed at an angle of; for instance, 45° to 90°, in the outwardly-projecting rim 133a of the upper portion of the silencer spacer 133. In addition, as shown in FIG. 6(a) and FIG. 7(a), protuberances 133f that are equal in number to the engagement holes 133e are formed on the lower side of the outwardly-projecting rim 133c in the lower portion of the silence spacer 133. FIG. 7(a) is an enlarged view of D shown in FIG. 6(a), and FIG. 7(b) is an enlarged view of B shown in FIG. 6(a).

Procedures for fitting the silencer spacer 133 of a preferred embodiment of the present invention to the cylindrical outshoot 118A are now described.

The silencer spacer 133 shown in FIG. 5 represents; for instance, an example of three silencer spacers 133 being fitted to the cylindrical outshoot 118A. Specifically, the silencer spacer 133 is made up of a topmost silencer spacer 133D, a middle silencer spacer 133E that is to be fixedly fitted to a lower portion of the silencer spacer 133D; and a lowermost silencer spacer 133F that is to be fixedly fitted to a lower portion of the middle silencer spacer 133E.

The space area 133C of the lowermost silencer spacer 133F is filled with a noise absorbing material 134.

Figure 8:
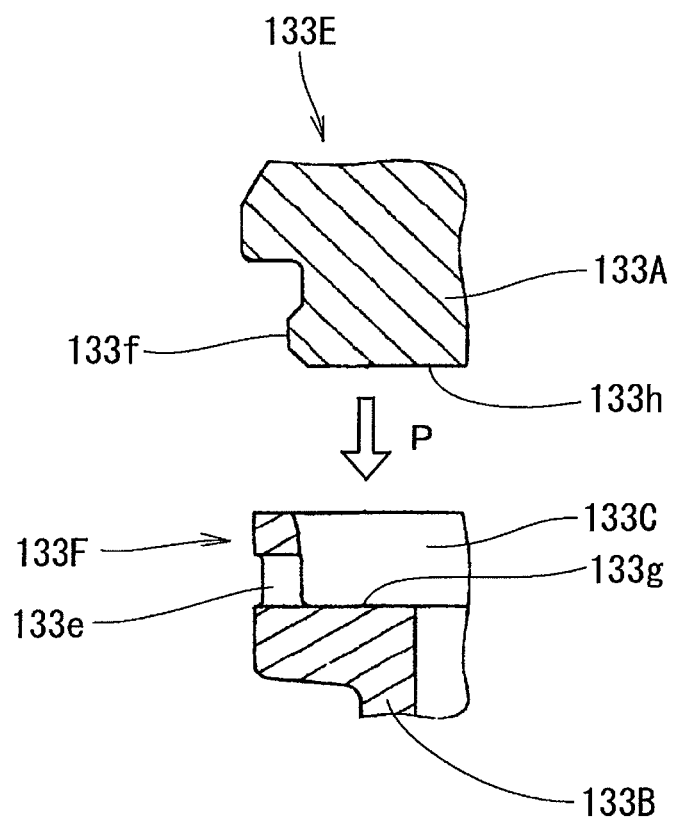
FIG. 8 is an enlarged cross sectional view of a silencer spacer according to a preferred embodiment of the present invention, showing a state in which a lowermost silencer spacer and a middle silencer spacer are fixedly fitted to each other.
Figure 9:
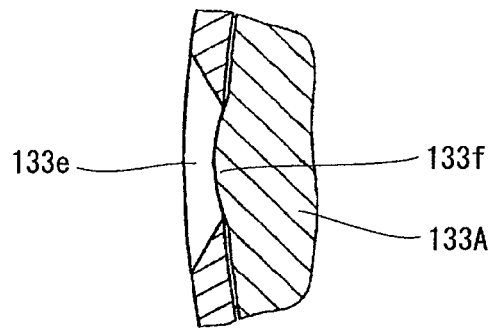
FIG. 9 shows enlarged cross cut planes showing a structure shown in FIG. 8, wherein (a) is a cross sectional view taken along arrow-headed line C-C shown in (b) and wherein (b) is an enlarged cross sectional view showing a state in which the lowermost silencer spacer and the middle silencer spacer are fixedly fitted to each other.
Figure 9:
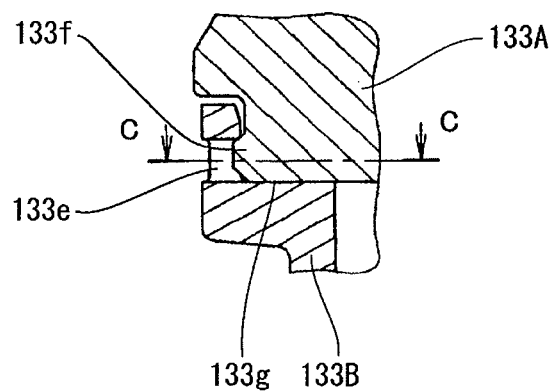

When the protuberances 133f of the middle silencer spacer 133E are fixedly fitted to an upper surface of the base 133A of the lowermost silencer spacer 133F; namely, when the protuberances 133f of the middle silencer spacer 133E are fixedly fitted to the respective engagement holes 133e opened in the outwardly-projecting rim 133a in the upper side of the outer case 133B, a bottom surface 133h of the base 133A of the silencer spacer 133E is fitted into a step-shaped portion 133g of the pace area 133C of the lowermost silencer spacer 133F in arrow-headed direction P as shown in FIG. 8, whereby the protuberances 133f of the base 133A of the middle silencer spacer 133E are fitted to the respective engagement holes 133e. When the topmost silencer spacer 133D is placed on top of the middle silencer spacer 133E, the protuberances 133f are fitted into the respective engagement holes 133e along similar procedures, whereupon assembly operation is completed.

Thus, a desired amount of silencer spacers can be fitted to the inside of the cylindrical outshoot 118A through the procedures, such as those mentioned above. In the preferred embodiment shown in FIG. 5, three silencer spacers 133D to 133F can be fixedly fitted. In the preferred embodiment shown in FIG. 5, a layout of the engagement holes 133e and the protuberances 133f in the respective silencers spacers 133D to 133F is identical with that shown in FIG. 6(a). Accordingly, the groups of small pores 133d that belong respectively to the three silencer spacers; namely, the topmost silencer spacer 133D, the middle silencer spacer 133E, and the lowermost silencer spacer 133F and that are opened in the base 133A are in phase with each other. The compressed air discharged from the drain valve 132a is delivered straightforwardly through the groups of small pores 133d from the topmost silencer spacer 133D to the lowermost silencer spacer 133F.

In the present embodiment of the present invention shown in FIG. 5, the compressed air discharged out of the drain valve 132a first, straightforwardly flows into the group of small pores 133d of the topmost silencer spacer 133D and the group of small pores 133d of the middle silencer spacer 133E. Subsequently, the compressed air discharged out of the group of small pores 133d of the middle silencer spacer 133E once flows into the noise absorbing material 134. The noise absorbing material 134 lessens noise incident to emission of the compressed air. The compressed air discharged out of the noise absorbing material 134 flows into the group of the small pores 133d of a lowermost silencer spacer 133F, to thus exit outside.

As mentioned above, the second preferred embodiment of the present invention has the following function. Namely, the three silencer spacers are put in the cylindrical outshoot 118A, thereby lessening noise incident to emission of the compressed air. Further, the noise absorbing material 134 is sandwiched between the middle silencer spacer and the lowermost silencer spacer, thereby being able to lessen noise to a much greater extent.

Descriptions are now given to a case where the silencer spacers are fixedly put in the cylindrical outshoot 118A while the engagement holes 133e and the protuberances 133f of the respective three silencer spacers 133D, 133E, and 133F are out of alignment to each other in a direction of rotation. In the embodiment pertaining to the structure of the silencer in the compressed air drying apparatus of the present invention shown in FIG. 5, the compressed air discharged out of the drain valve 132a flows through the group of small pores 133d formed in the base 133A while passing through the space area 133C of the topmost silencer spacer 133D, to thus flow into the space area 133C and the group of small pores 133d of the middle silencer spacer 133E.

Incidentally, as shown in FIG. 6(b), the middle silencer spacer 133E is placed while remaining out of phase with each other by a preset angle θ from the set position of the topmost silencer spacer 133D in the cylindrical outshoot 118A in the left or right direction of rotation. The preset angle θ is set to 45° to 90°. Since the silencer spacers are arranged and configured as mentioned above, the group of small pores 133d of the topmost silencer spacer 133D and the group of small pores 133d of the middle silencer spacer 133E are not straightforwardly aligned in a penetrating manner along the vertical direction within the cylindrical outshoot 118A, to thus come out of phase with each other, even when the topmost silencer spacer 133D and the middle silencer spacer 133E have the same configuration. Accordingly, the compressed air discharged out of the drain valve 132a flows out of the group of small pores 133d of the topmost silencer spacer 133D and subsequently exits from the group of small pores 133d of the middle silencer spacer 133E while colliding against a circumferential wall surface of the group of small pores 133d.

Noise incident to emission of the compressed air is thereby lessened to a greater extent. The lowermost silencer spacer 133F is placed in such a way that the set position θ of the lowermost silencer spacer 133F comes out of phase with the set position of the middle silencer spacer 133E, in the right or left direction of rotation, within the cylindrical outshoot 118A as shown in FIG. 6(b). The preset angle θ is set to 45° to 90°.

Since the silencer spacers are arranged and configured as mentioned above, the group of small pores 133d of the middle silencer spacer 133E and the group of small pores 133d of the lowermost silencer spacer 133F are not straightforwardly aligned in a penetrating manner along the vertical direction within the cylindrical outshoot 118A even when the middle silencer spacer 133E and the lowermost silencer spacer 133F have the same configuration, to thus come out of phase with each other.

Accordingly, the compressed air discharged out of the drain valve 132a flows out of the group of small pores 133d of the middle silencer spacer 133E and once flows into the noise absorbing material 134. The noise absorbing material 134 lessens noise incident to emission of the compressed air. The compressed air then exits out of the group of small pores 133d while colliding against the circumferential wall surface of the group of small pores 133d of the lowermost silencer spacer 133F.

As mentioned above, the engagement holes 133e opened in the outwardly-projecting rim 133a of the silencer spacer 133

(133D, 133E, and 133F) in an upper portion and the protuberances 133f formed on the lower side of the outwardly-projecting rim 133c of the silencer spacer in a lower portion are present at every preset angles θ. Thereby, the topmost silencer spacer 133D and the middle silencer spacer 133E can be easily, quickly, fixedly fitted to each other.

As shown in FIG. 6(b), the lowermost silencer spacer 133F is placed so as to become out of phase with the set position of the middle silencer spacer 133E along the right or left direction of rotation by the preset angle θ. The preset angle θ is set to 45° to 90°. As mentioned above, the engagement holes 133e opened in the outwardly-projecting rim 133a of the silencer spacer 133 (133D, 133E, and 133F) in the upper portion and the protuberances 133f formed on the lower side of the outwardly-projecting rim 133c of the silencer spacer in the lower portion are present at every preset angles θ. Thereby, the middle silencer spacer 133E and the lowermost silencer spacer 133F can be easily, quickly, fixedly fitted to each other.

As mentioned above, the topmost silencer spacer 133D, the middle silencer spacer 133E, and the lowermost silencer spacer 133F are fixedly placed in the cylindrical outshoot 118A while remaining out of phase with one another in the direction of rotation (a circumferential direction). For instance, the group of small pores 133d of the topmost silencer spacer 133D and the group of small pores 133d of the middle silencer spacer 133E are out of phase with one another, so that the small pores 133d of both silencer spacers are not straightforwardly aligned. The compressed air flowed by way of the drain valve 132a flows through the group of small pores 133d of the topmost silencer spacer 133D and subsequently collides against the circumferential surface of the small pores 133d of the middle silencer spacer 133E.

The compressed air gradually flows through the group of small pores 133d of the middle silencer spacer 133E while temporarily building up in the space area 133C of the middle silencer spacer 133E. Likewise, the group of small pores 133d of the middle silencer spacer 133E and the group of small pores 133d of the lowermost silencer spacer 133F are out of phase with each other and are not straightforwardly aligned. Thus, the compressed air flowed by way of the group of small pores 133d of the middle silencer spacer 133E gradually flows outside of the cylindrical outshoot 118A while temporarily building up in the space area 133C of the lowermost silencer spacer 133F. An extremely high quality silencing effect is thereby yielded.

In the structure of the silencer of the present embodiment in connection with the compressed air drying apparatus of the present invention, the space area 133C of the lowermost silencer spacer 133F is filled with the noise absorbing material 134. Hence, the silencing effect for the compressed air flowed from the group of small pores 133d of the middle silencer spacer 133E can be further enhanced by means of the noise absorbing material 134 as well as by means of the configuration.

Incidentally, in relation to the layout of the engagement holes 133e and the protuberances 133f in each of the topmost silencer spacer 133D, as shown in FIG. 6(a), the middle silencer spacer 133E, and the lowermost silencer spacer 133F, the engagement holes 133e formed in the outwardly-projecting rim 133a in the upper portion of the topmost silencer spacer 133D, the outwardly-projecting rim 133a in the upper portion of the middle silencer spacer 133E, and the outwardly-projecting rim 133a in the upper portion of the lowermost silencer spacer 133F are vertically aligned to the protuberances 133f formed on the lower side of the outwardly-projecting rim 133c in the lower portion of the topmost silencer spacer 133D, on the lower side of the outwardly-projecting rim 133c in the lower portion of the middle silencer spacer 133E, and on the lower side of the outwardly-projecting rims 133c in the lower portion of the lowermost silencer spacer 133F. However, for instance, the respective protuberances 133f can also be set in an intermediate position between the respective engagement holes 133e and formed in the lower side of the outwardly-projecting rim 133c of each of the lower portions. If the silencer spacers are configured as mentioned above, the middle silencer spacer 133E and the lowermost silencer spacer 133F can be fixedly fitted, while remaining intact, to the inside of the cylindrical outshoot 118A without being rotated leftward or rightward. Thus, there is achieved a function of making it possible to bring the set angle θ between the topmost silencer spacer 133D and the middle silencer spacer 133E out of phase with the set angle θ between the middle silencer spacer 133E and the lowermost silencer spacer 133F. Thus, the topmost silencer spacer 133D, the middle silencer spacer 133E, and the lowermost silencer spacer 133F can be easily fitted into the cylindrical outshoot 118A, whereby ease of installation is enhanced.

In the preferred embodiment of the structure of the silencer of the compressed air drying apparatus of the present invention, the three silencer spacers 133 are placed within the cylindrical outshoot 118A. However, the number of the silencer spacers is not limited to three. The objective of the present invention can be accomplished by placing two or a plurality of silencer spacers 133 according to design specifications of the compressed air drying apparatus, an apparatus to which the silencers are to be applied, or the like. Further, the set position θ of the upper silencer spacer 133 having the group of small pores 133d arranged within the substantially hexagonal outline L2 and the set position θ of the lower silencer spacer 133 where the group of small pores 133d is arranged within the substantially hexagonal outline L2 set so as to be 45° to 90° out of phase with each other. However, the group of small pores 133d in the upper silencer spacer and the group of small pores 133d in the lower silencer spacer can be prevented from being straightforwardly aligned along the vertical direction, so long as the upper and lower silencer spacers are brought into out of phase with each other in such a way that the set positions θ assume a value other than that determined by (360°/6)×an integer. In the case of a silencer spacer in which the group of small pores 133d is arranged within a substantially, regular polygon with N sides, the group of small pores 133d in the upper silencer spacer and the group of small pores 133d in the lower silencer spacer can be prevented from being straightforwardly aligned, so long as the upper and lower silencer spacers are brought into out of phase with each other such that the set positions θ assume a value other than that determined by (360°/N)×an integer, where N is an integer.

Figure 10:
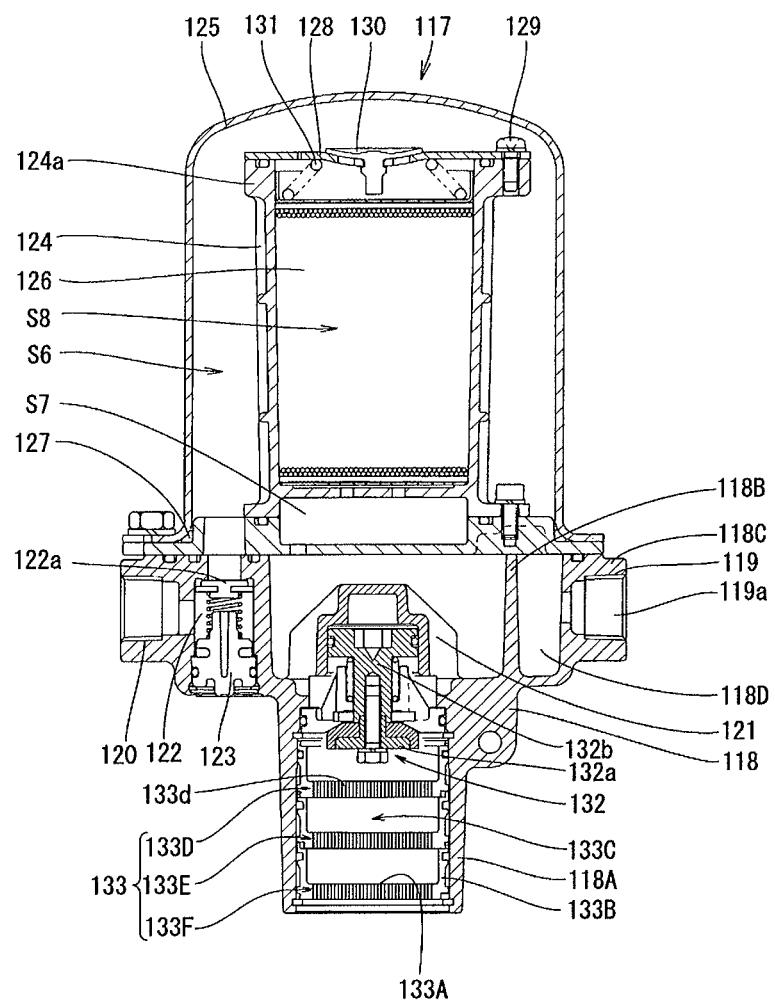
FIG. 10 is a vertical cross sectional view showing a first preferred embodiment of the structure of the silencer belonging to the compressed air drying apparatus of the present invention.

FIG. 10 is a vertical cross sectional view showing the first preferred embodiment of the structure of the silencer belonging to the compressed air drying apparatus of the present invention.

Explanations are now given to make explicit the first preferred embodiment of the structure of the silencer employed in the compressed air drying apparatus of the present invention.

The present invention of the preferred first embodiment corresponds to a structure from which the noise absorbing material 134 shown in FIG. 5 is excluded. The structure of the first embodiment exhibits the function of ability to curtail the number of components and manufacture the silencer in a light-weight and inexpensive manner; hence, a desired advantage can be yielded by means of only the silencer spacer. The other constituent elements, operation of the silencer, and the like, are identical with those described in connection with the structure of the embodiment shown in FIG. 5 and hence the same reference numerals are assigned to the constituent elements. Explanations of the reference numerals are therefore omitted here for brevity.

The feature of the second preferred embodiment of the structure of the silencer employed in the compressed air drying apparatus of the present invention lies in the structure in which the two silencer spacers 133, 133 are placed within the cylindrical outshoot 118A and in which the noise absorbing material 134 that is identical with that mentioned above is sandwiched between the two silencer spacers 133, 133. Specifically, the space area 133C of the lower silencer spacer 133 is first filled with the noise absorbing material 134. The bottom surface 133h of the base 133A of the upper silencer spacer 133 is fitted to the step-shaped portion 133g formed in the space area 133C of the lower silencer spacer 133, whereby the protuberances 133f of the upper silencer spacer 133 are fittingly engaged into the respective engagement holes 133e of the lower silencer spacer 133. The compressed air drying apparatus equipped with the two silencer spacers 133, 133 with the noise absorbing material 134 sandwiched therebetween is thereby assembled. In the second embodiment, the entire length of the compressed air drying apparatus can be set so as to become much shorter than the entire length of the structure described in connection with the implementation mode and the entire length of the structure described in connection with the first embodiment, so that the compressed air drying apparatus can be miniaturized. The other constituent elements, operation, and the like, of the silencer spacers are the same as those shown in FIG. 5, and hence their explanations are omitted.

Although the present invention has been described as the silencers for the compressed air drying apparatus in connection with the embodiments, the present invention can be applied to all elements belonging to the field of compressed air supply system that let compressed high-pressure air exit out to a low pressure side, like an atmosphere. The present invention is applicable to; for instance, a brake valve, a protection valve, a relay valve, and the like.

The present invention is utilized particularly for the field of a compressed air supply system of an automobile and aims at dehumidifying and purifying compressed air that flows into the compressed air drying apparatus, sufficiently lessening noise incident to emission of the compressed air by use of silencers, and miniaturizing a silencer housing section.

The present invention is utilized in the field of a compressed air supply system of an automobile and applied to general pieces of pneumatic equipment including replaceable cartridges as well as to a vehicle air drying apparatus using a replaceable cartridge.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:
1. A structure of an external cover of an air drying apparatus, the structure comprising:
   an outer case;
   a base housed in the outer case and including a large-diameter cylindrical body;
   a small-diameter cylindrical body formed integrally with the large-diameter cylindrical body;
   a drying case including a desiccant filled in the large-diameter cylindrical body, the base being fixed to a lower end of the drying case and including an inlet port and an outlet port for compressed air, the base being fixed by swaging an outer edge thereof to a lower end of the outer case, wherein the external cover includes:
      a rising piece inserted into and engaged with the inlet port of the base for compressed air;
      a first slope formed at an intermediate position between the rising piece and a bottom;
      an outer vertical wall formed so as to rise from the bottom;
      a top face formed at an upper end of the outer vertical wall;
      an inner vertical wall formed opposite to the outer vertical wall;
      a circular-arc portion formed at a lower end of the inner vertical wall;
      a second slope formed at a position on the circular-arc portion that corresponds to an intermediate position of a height of the external cover and a position of a predetermined height from a lower end face;
      an outermost vertical wall formed so as to fall from the second slope by way of the circular-arc position, an angle of inclination between a back surface of the second slope and a back surface of the outermost vertical wall is about 45°; and
      a sealing agent fitted to an indentation defined by the outer vertical wall, the top face, and the inner vertical wall.

2. The structure of an external cover of an air drying apparatus according to claim 1, wherein an angle of inclination between a surface of the first slope and a surface of the outer vertical wall is set to 45°.

* * * * *